July 17, 1956  R. W. FULLER ET AL  2,754,640
APPARATUS FOR ROTATING AND AXIALLY FEEDING WORK
Filed Sept. 10, 1954  5 Sheets-Sheet 1

Inventors:
Rufus W. Fuller
Raymond A. Cole
by James R. Hodder
Attorney

July 17, 1956 R. W. FULLER ET AL 2,754,640
APPARATUS FOR ROTATING AND AXIALLY FEEDING WORK
Filed Sept. 10, 1954 5 Sheets-Sheet 2
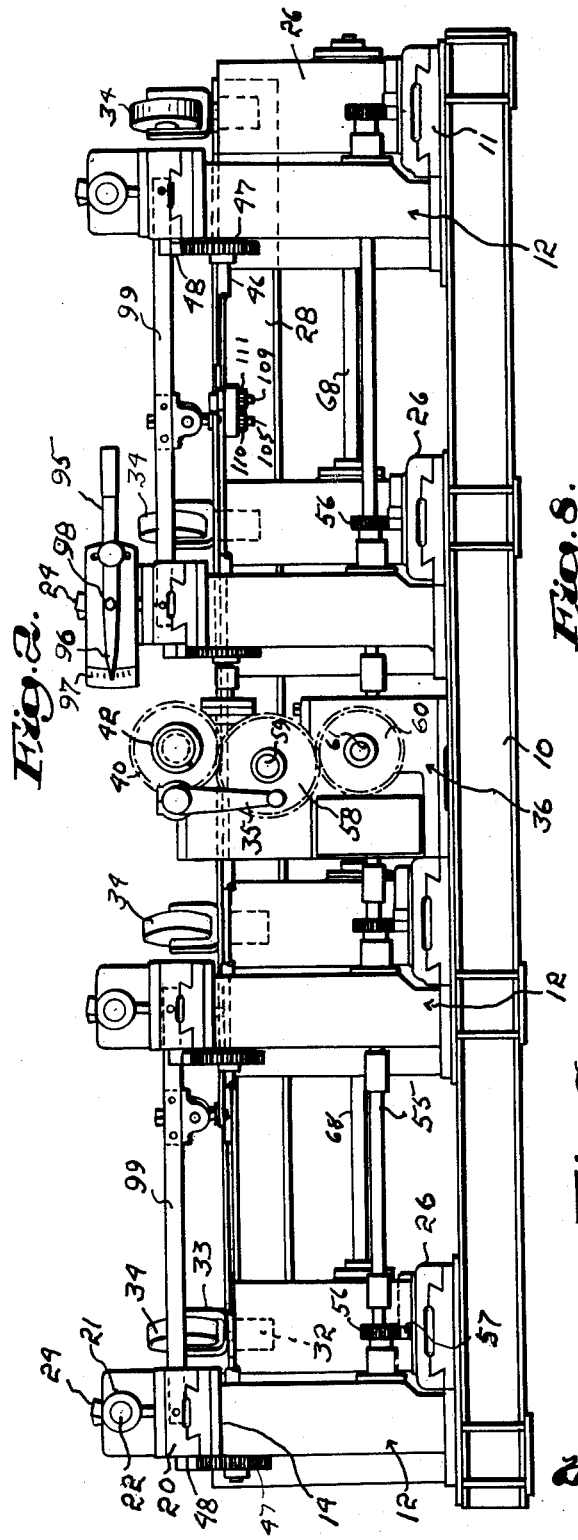
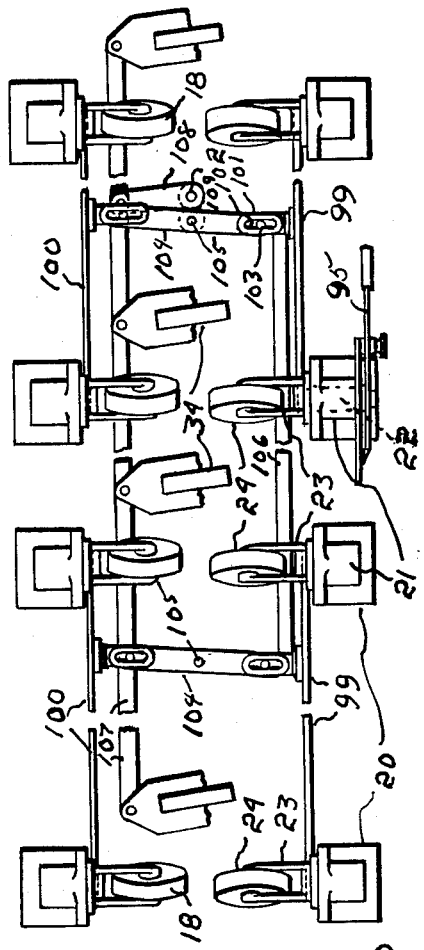
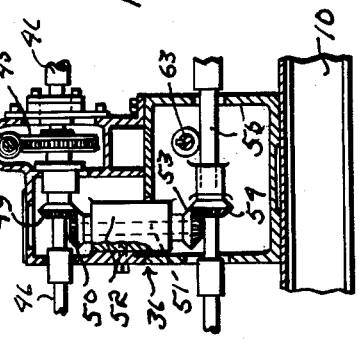
Inventors:
Rufus W. Fuller
Raymond A. Cole
by James R. Hodder
Attorney

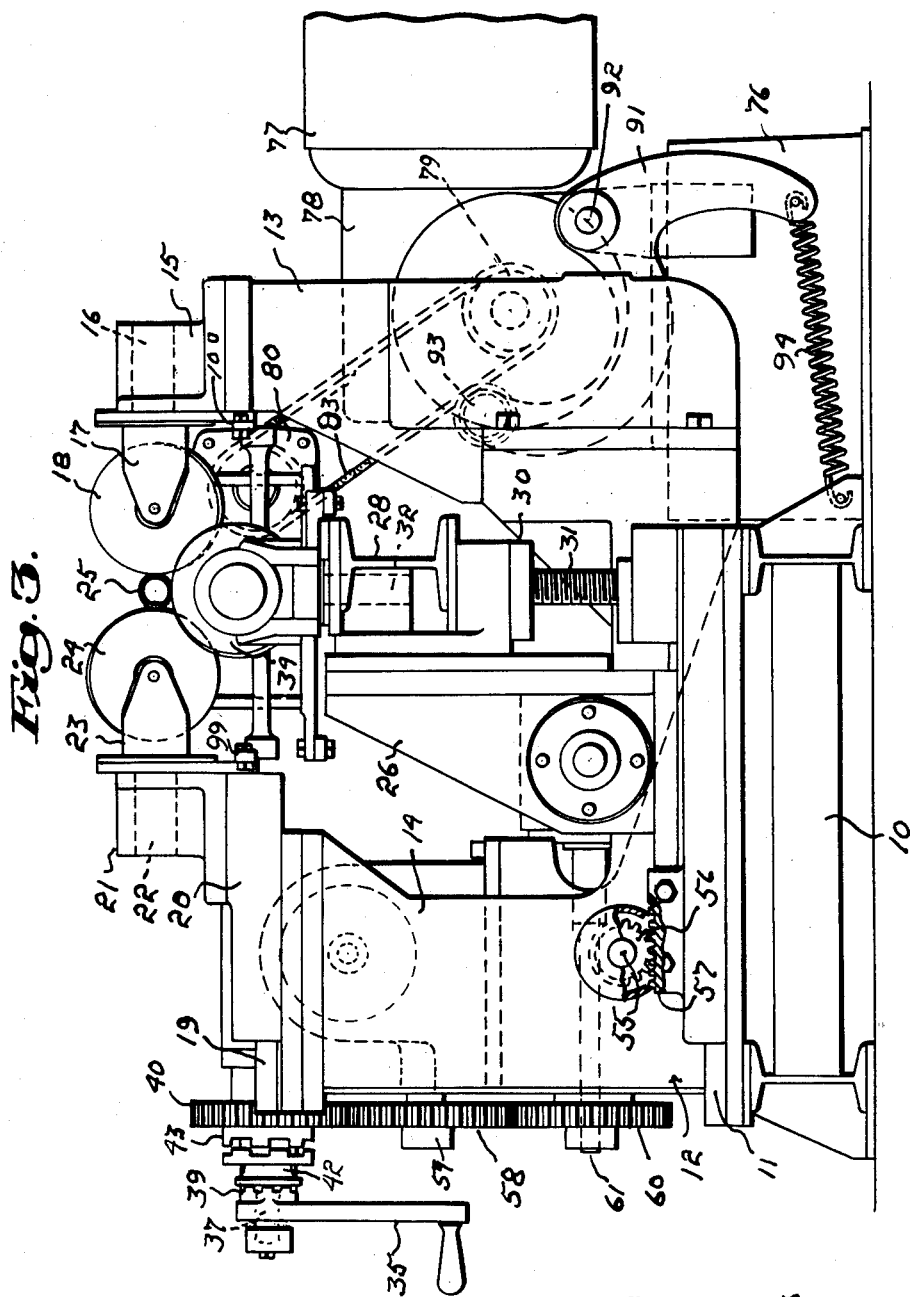

July 17, 1956 R. W. FULLER ET AL 2,754,640
APPARATUS FOR ROTATING AND AXIALLY FEEDING WORK
Filed Sept. 10, 1954 5 Sheets-Sheet 4

Inventors:
Rufus W. Fuller
Raymond A. Cole
James R. Hodder
by Attorney

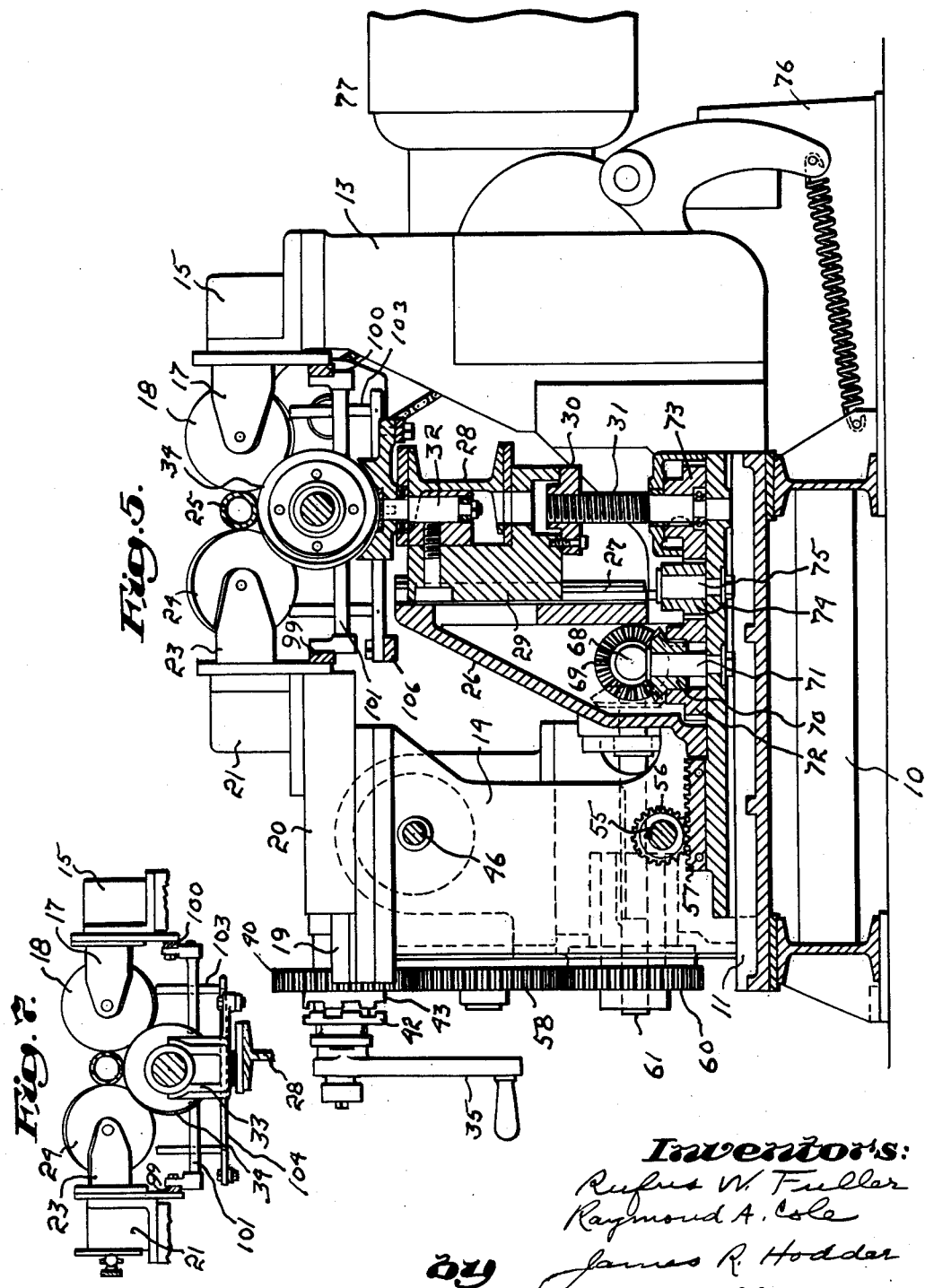

United States Patent Office 2,754,640
Patented July 17, 1956

2,754,640

APPARATUS FOR ROTATING AND AXIALLY FEEDING WORK

Rufus W. Fuller, Deerfield, and Raymond A. Cole, Greenfield, Mass., assignors to Production Machine Company, Greenfield, Mass.

Application September 10, 1954, Serial No. 455,295

5 Claims. (Cl. 51—215)

The present invention relates to apparatus for rotating and axially feeding work in the form of a length of round stock, and is an improvement on the work-supporting mechanism of the type disclosed in the prior patents of Rufus W. Fuller No. 1,909,984 dated March 14, 1933 and No. 2,165,097 dated July 4, 1939.

While our apparatus in accordance with this invention is adapted for a wide range of uses, its objectives, novel features, and advantages are herein set forth with particular reference to the feeding of lengths of round stock to and from centerless grinders as illustrative of operations where support for work of substantial length is necessary.

Our apparatus provides for the positioning of the work between two series of idler rolls which engage diametrically opposed portions thereof and on a series of driven rolls which engage the work in a zone included in a vertical plane through its axis. Adjusting means are provided, having the objective of adapting the apparatus for work of a wide range of diameters with the centers being in the same horizontal plane regardless of the diameter. Each of the series of rolls has mechanisms by which their angular relationship to the axis of the work can be readily varied to control accurately its axial movement.

Among the objectives of the invention is that of providing adjusting means by which the spacing of the three series of rolls is simultaneously varied by the operation of one control to provide the same relative disposition of them with work of different diameters. This objective is met by providing two separate mechanisms for the supporting structure for the third series of rolls, one operative to move the rolls vertically and the other operative to move them transversely. Both are operated simultaneously, when the idler rolls are adjusted as required by the diameter of the work, while the former may be operated by itself.

Another objective is to provide means to enable the desired angular relationship of all the rolls of all the series to be simultaneously effected in the control of the axial movement of the work.

Other objectives pertain to general structural features enabling the above objectives to be fully realized and contributing to the general adaptability of the apparatus to the various requirements to be encountered in handling such work.

In the accompanying drawings, there is shown an illustrative embodiment of the invention from which these and other of its objectives, novel features and advantages will be readily apparent.

In the drawings:

Fig. 2 is a front view of the apparatus;

Fig. 3 is a view on an enlarged scale of the right end of the apparatus as seen in Figs. 1 and 2;

Figure 1:
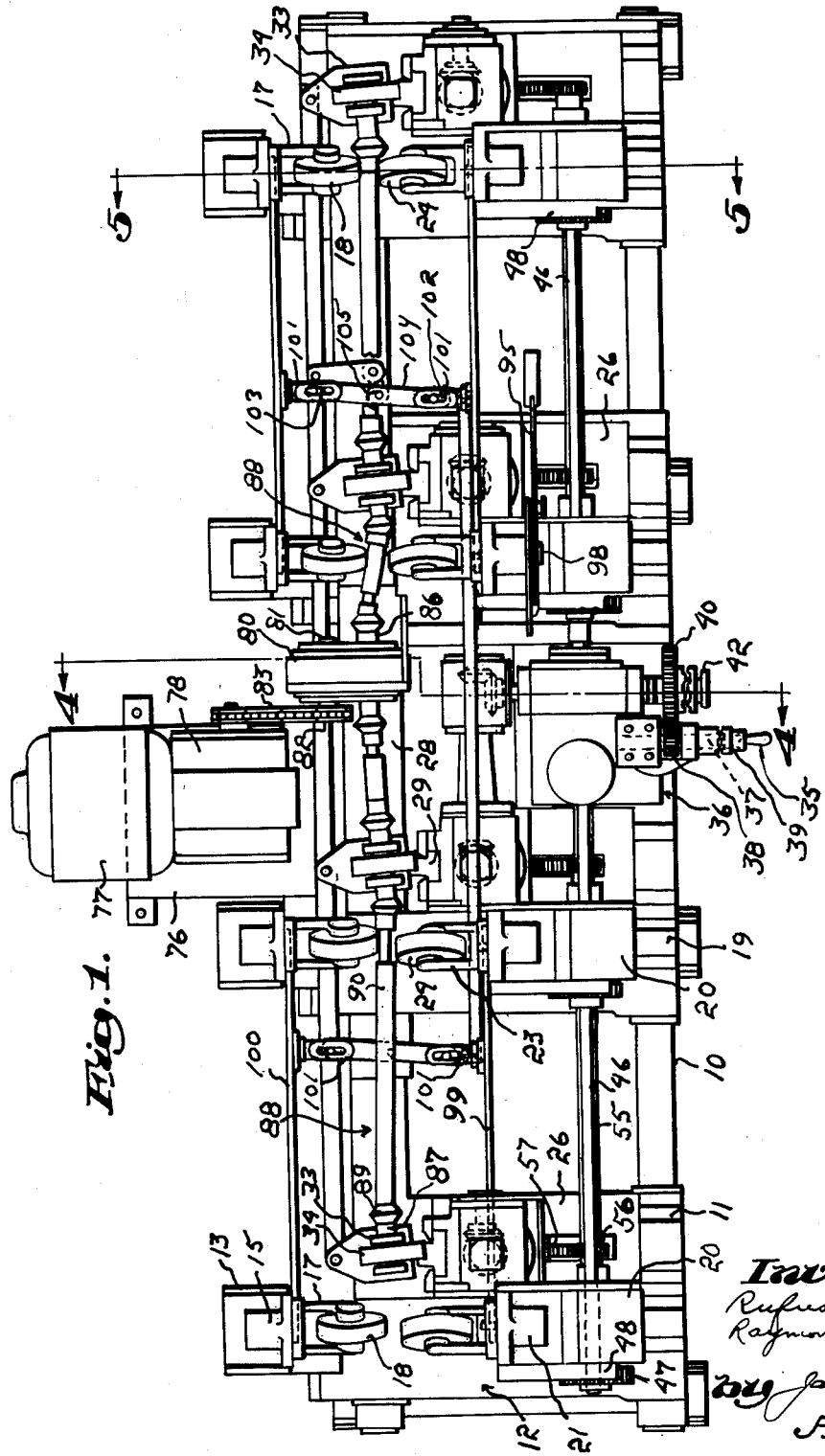
Fig. 1 is a top plan view of apparatus in accordance with the invention.
Figure 4:
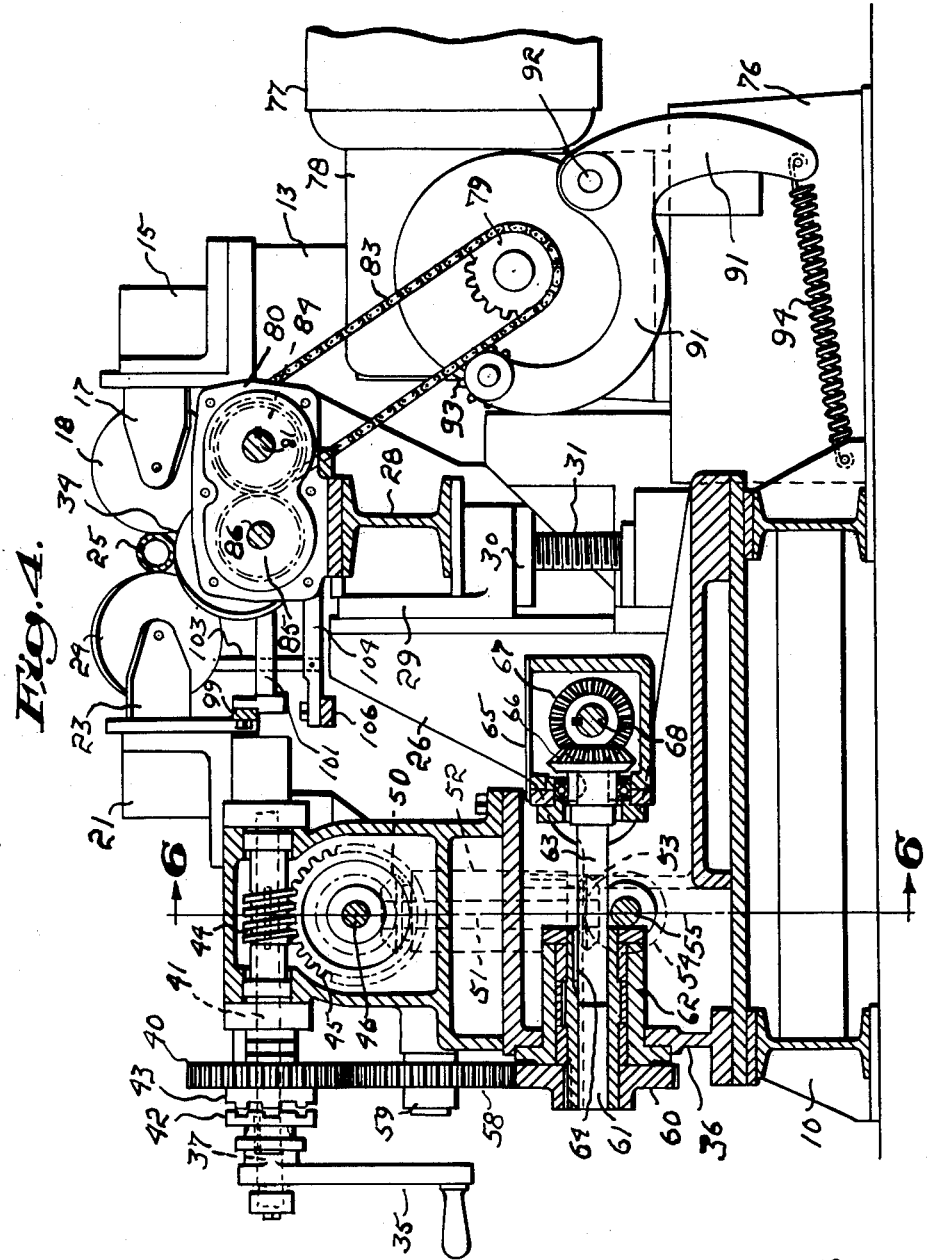

Figs. 4 and 5 are sections, on the scale of Fig. 3, taken along the indicated lines 4—4 and 5—5, respectively, of Fig. 1;

Fig. 6 is a section, on the scale of Figs. 1 and 2, taken along the indicated lines 6—6 of Fig. 4;

Fig. 7 is a fragmentary view on the scale of and generally similar to Fig. 5 but showing only the rolls and their supporting mechanisms, and Fig. 8 is a fragmentary plan view illustrating the rolls, their supporting mechanisms and actuating means therefor.

The apparatus detailed in the drawings has its base 10 provided with horizontal transverse ways 11. On the corresponding side of each way 11, there is a vertical support generally indicated at 12, and including a back part 13 and a front part 14. The upper ends of the parts 13 and 14 are transversely spaced one from the other.

On the upper end of each back part 13, there is a mount 15 rotatably supporting the spindle 16 of a yoke 17 (see Fig. 3). A roll 18 is carried by each yoke 17. Each front part 14 has a horizontal transverse way 19 for a slide 20. Each slide 20 is provided with a mount 21 rotatably supporting the spindle 22 of a yoke 23, each of which carries a roll 24. The series of rolls 18 and the series of rolls 24 are spaced apart as required by the diameter of the work 25.

A slide 26 is mounted on each way 11 of the base 10 and has a vertical way 27, as may best be seen in Fig. 5. An I-beam 28, disposed lengthwise of the base 10, has slides 29 secured to it, there being one such slide for each vertical way 27. At the bottom of each slide 29 there is a nut 30 which receives a screw 31 by which the beam 28 is raised and lowered by means subsequently described. Extending vertically downward through the upper part of the beam 28 into its slide 29 and rotatably supported thereby are the spindles 32 of the yokes 33, each carrying a roll 34. The series of rolls 34 is located below and between the other two series of rolls to have a zone of engagement with the work 25 approximately in a vertical plane through the center thereof. The position of the rolls 34 is determined by the radius of the work 25.

In adjusting the apparatus for work of a different diameter, the rolls 24 are moved towards or away from the series of rolls 18 as required by the diameter of the work since it is to be engaged by these series at diametrically opposed zones. Such adjustment also entails movement of the rolls 34 upwardly towards, or downwardly from, the rolls 18. In other words, the rolls 34 must move vertically a distance represented by the change in radius and also a like distance towards and away from the rolls 18 to bring them into the vertical plane through the center of the work so that the three series of rolls will have the same relative disposition.

These adjustments are conveniently made by means of a crank 35 at a control unit 36 approximately centrally of the front of the apparatus. The crank 35 is slidably supported by the shaft 37 for the spur gear 38 for rotation independently thereof, but may be connected thereto as by interengagement of the jaw clutch 39.

In Fig. 1 the clutch 39 is shown as disengaged and reference is made to Fig. 3 for a showing of the clutch engaged. The spur gear 38 meshes with the gear 40, which is supported by the shaft 41 for rotation independently thereof but adapted to be connected thereto as by engagement of the complemental jaw clutch portions 42 and 43 (see Fig. 4). The clutch portion 42 is slidably splined to the shaft 41 while the clutch portion 43 rotates with the gear 40.

The shaft 41 has a worm gear 44 meshing with the gear 45 (see Figs. 4 and 6) of the control unit 36 fast on the shaft 46 which extends horizontally from end-to-end of the apparatus and carries spur gears 47, one for each support 12 and meshing with the rack 48 of its slide 20.

By this arrangement, the series of rolls 24 are moved towards and away from the series of rolls 18.

The shaft 46 is also provided with a bevel gear 49 in the control unit 36, as may best be seen in Fig. 6, meshing with a like gear 50 on the upper end of the vertical shaft 51 journalled in a mount 52. On the lower end of the shaft 51 is a bevel gear 53 meshing with a like gear 54 on the shaft 55 below but parallel with the shaft 46 and extending from the control unit 36 towards both ends of the apparatus. The shaft 55 has gears 56, one for each slide 26, and meshing with its rack 57. By this construction, movement of the series of rolls 24 towards or away from the series of rolls 18 is attended by corresponding, but proportionately shorter, movements of the slides 26 and the series of rolls 34.

In addition to the in-or-out adjustment of the slides 26 in re-positioning the series of rolls 34, it is necessary to move them vertically if the center of the work is to be in a plane inclusive of the centers of the rolls 18 and 24. To effect this result, an idler gear 58 carried by the stub shaft 59 and meshing with the spur gear 60 on the shaft 61 is driven by the spur gear 40.

As may be seen in Fig. 4, the shaft 61 is tubular and is supported in the control unit 36 by a bearing unit 62 to slidably receive the shaft 63 to which it is keyed as at 64, thus providing a telescoping driving connection between the spur gear 60 and the gear box 65 in which are located meshing bevel gears 66 and 67 on the shafts 63 and 68, respectively.

The shaft 68 extends horizontally from end-to-end of the apparatus and carries miter gears 69, one for each slide 26 (see Fig. 5). Each miter gear 69 meshes at each slide 26 with a like gear 70 assembled on its vertically disposed stub shaft 71 with a spur gear 72 to drive the gear 73, keyed to the vertical screw 31 of the slide 26, through the idler 74, whose stub shaft is indicated at 75.

It will be apparent from the foregoing that with the clutches 39 and 42, 43 engaged, adjustments among the three series of rolls are readily effected for work of larger or smaller diameter by turning the crank 35 in one direction or the other. With neither clutch engaged, accidental changes in roll settings are avoided, and with only the clutch 39 engaged, the crank 35 may be turned to move only the series of rolls 34 vertically. In centerless grinding or polishing, for example, it is often desirable to have the center of the work above or below that of the grinding member.

In the embodiment of the invention shown in the drawing, only the series of rolls 34 are rotated. At the rear of the apparatus and approximately centrally thereof, is a base part 76 for the motor 77, whose gear box 78 has a drive sprocket 79 (see Fig. 4). On the beam 28 there is a gear box 80, having a shaft 81 carrying a sprocket 82 connected to the sprocket 79 by the chain 83. Within the gear box, there are meshing gears 84 and 85 (see Fig. 4), the former being fast on the shaft 81, and the latter being fast on the shaft 86.

Each roll 34 is connected to its yoke 33 by means of a stub shaft 87 (see Fig. 1). The stub shafts 87 are connected to each other and to the shaft 86 by means of units, generally indicated at 88, and comprising a pair of universal joints 89 and a length of telescoping shafting 90.

The drive for the rolls 34, when the motor 77 is of the type subject to having its speed infinitely varied, enables the surface speed of the rolls 34 to be synchronized with that of the other apparatus, such as a grinding machine. While means to control the motor speed are not shown, there is shown chain-tightening means, as shown in Fig. 4, comprising an arm 91 pivoted as at 92 adjacent the motor 77, and having a sprocket 93 in engagement with the chain 83 into which position it is yieldably urged by the spring 94.

It will be apparent that the effect of the rolls 34 on the work is simply to rotate it as long as the axes of all the rolls of all series are parallel to the axis of the work. When the axes of the rolls are at an angle with respect to the work axis, the work will be fed at a rate that depends on the speed of the rolls and their angularity. The direction in which the work is fed depends upon which way the rolls are swung.

Means are, accordingly, provided to effect angular work-feeding positions of the rolls 34 by which the direction and rate of feed may be accurately controlled through a suitably wide range. While the series of rolls 18 and the series of rolls 24 are idlers, means are also provided to enable their angular relationship relative to the work axis to be varied.

Adjacent the central unit 36 there is shown in Fig. 2 a hand lever 95, including a pointer 96 at one end readable with reference to the series of graduations 97. The hand lever 95 is attached as at 98 to the spindle 22 of a yoke 23, and as it is swung the angular relation of one of the rolls 24 to the axis of the work is varied.

In describing the mechanism by which all the rolls of all series thereof are simultaneously adjusted to the angular relationship effecting the desired control of the axial movement of the work, reference is made particularly to Figs. 1, 2, 7 and 8. The two right-hand and the two left-hand rolls 24 are interconnected by means of a tie piece 99 pivotally connected to their yokes 23.

The two right-hand and the two left-hand rolls 18 are similarly interconnected by a tie piece 100 pivotally secured to their yokes 17. Each tie piece has a shipper fork 101 slotted as at 102 to receive one of the two vertically disposed pins 103 with which the shipper arm 104 is provided. The arm 104 has a pivot 105 extending through the upper flange of the beam 28 (see Fig. 2). In the embodiment of the invention herein detailed, arms 104 have links 106 pivotally connected thereto.

From the mechanism thus far described, it will be apparent that when the lever 95 is swung to effect the desired axial feed of the work, the series of rolls 24 and the series of rolls 18 are equally swung into corresponding work-feeding positions.

It will be noted that a connecting link 107 is pivotally connected to each yoke 33 of the series of rolls 34, and that one end of an arm 108 is pivotally connected thereto. The arm 108 has a supporting pivot 109 extending through the upper flange of the beam 28 in close proximity to one of the pivots 105. The two pivots 105 and 109 carry intermeshing gears 110 and 111, respectively, thus to cause simultaneous matching movement of the series of rolls 34 with the other two series.

While the mechanism described provides means for adjusting the angular position of all rolls of all series, the invention contemplates the axial feed of the work by means of the angular adjustment of only the rolls of one series, particularly the series of rolls 34.

It will be understood that the number of rolls in the series thereof is largely a matter of choice. In practice, however, it is found convenient to employ, where necessary, two or more units in series, each similar to the apparatus shown in the drawings.

We claim:

1. In apparatus for rotating and axially feeding work in the form of a length of round stock, first, second, and third series of rolls, the rolls of the first and second series being spaced and arranged to engage the work in opposed zones, the rolls of the third series being spaced and arranged between and below the rolls of the first and second series to engage the work in a zone approximately included in a vertical plane through the axis of the work, means to vary simultaneously the spacing of the three series of rolls to provide the same relative disposition of them with work of different diameters, said means comprising a first gear train for the rolls of the first series, a second gear train for the rolls of the third series, both including horizontally operative connections to move their respective rolls horizontally, and a third gear train for the rolls of the third series, a portion of which is positioned by the second gear train and which has a vertically operative connection with the rolls of the third series to move its rolls vertically, said third gear train including a telescoping section proximate said portion.

2. In apparatus for rotating and axially feeding work in the form of a length of round stock, first, second, and third series of rolls, the rolls of the first and second series being spaced and arranged to engage the work in opposed zones, the rolls of the third series being spaced and arranged between and below the rolls of the first and second series to engage the work in a zone approximately included in a vertical plane through the axis of the work, means to vary simultaneously the spacing of the three series of rolls to provide the same relative disposition of them with work of a different diameter, said means comprising a first gear train for the rolls of the first series, a second train for the rolls of the third series, both including horizontally operative connections to move their respective rolls horizontally, a third gear train for the rolls of the third series, a portion of which is positioned by the second gear train and has a vertically operative connection with the rolls of the third series to move its rolls vertically, said third gear train including a telescoping section proximate said portion, and a common drive for all three trains, each of the second and third gear trains being operative to actuate its connection to move the rolls of the third series one half the distance the first gear train actuates its connection to move the rolls of the first series.

3. In apparatus for rotating and axially feeding work in the form of a length of round stock, first, second, and third series of rolls, the rolls of the first and second series being spaced and arranged to engage the work in opposed zones, the rolls of the third series being spaced and arranged between and below the rolls of the first and second series to engage the work in a zone approximately included in a vertical plane through the axis of the work, means to vary the spacing of the three series of rolls to provide the same relative disposition of them with work of a different diameter, said means comprising a first gear train for the rolls of the first series, a second gear train for the rolls of the third series, both including horizontally operative connections to move their respective rolls horizontally, a third gear train for the rolls of the third series, a portion of which is positioned by the second gear train and has a vertically operative connection with the rolls of the third series to move its rolls vertically, said third gear train including a telescoping section proximate said portion, and a common drive for all three trains including a clutch operative to disengage the first and second trains simultaneously therefrom.

4. In apparatus for rotating and axially feeding work in the form of a length of round stock, first, second, and third series of rolls, the rolls of the first and second series being spaced and arranged to engage the work in opposed zones, the rolls of the third series being spaced and arranged between and below the rolls of the first and second series to engage the work in a zone approximately included in a vertical plane through the axis of the work, means to vary the spacing of the third series of rolls relative to the other series thereof, said means including a horizontally disposed first slide, a vertically disposed second slide carried by said first slide, and gear trains operatively connected to respective ones of said slides, the gear train for the second slide including parts carried by the first slide and a telescoping drive therefor.

5. In apparatus for rotating and axially feeding work in the form of a length of round stock, first, second, and third series of rolls, the rolls of the first and second series being spaced and arranged to engage the work in opposed zones, the rolls of the third series being spaced and arranged between and below the rolls of the first and second series to engage the work in a zone approximately included in a vertical plane through the axis of the work, means to vary the spacing of the third series of rolls relative to the other series thereof, said means including a horizontally disposed first slide provided with a rack, a vertically disposed second slide carried by said first slide and provided with a fixed nut, and first and second gear trains operatively connected to said rack and nut respectively, the second gear train including parts positioned by the first slide and a telescoping drive therefor.

References Cited in the file of this patent

UNITED STATES PATENTS

| | | |
|---|---|---|
| 1,319,000 | Holbein | Oct. 14, 1919 |
| 1,355,616 | Mohn | Oct. 12, 1920 |
| 1,713,678 | Seibert | May 21, 1929 |
| 1,790,668 | Koon | Feb. 3, 1931 |
| 2,165,097 | Fuller | July 4, 1939 |